United States Patent [19]
Alofs et al.

[11] Patent Number: 5,434,781
[45] Date of Patent: Jul. 18, 1995

[54] METHOD AND APPARATUS FOR GUIDING A DRIVERLESS VEHICLE USING A SENSOR TRACKING A CABLE EMITTING AN ELECTROMAGNETIC FIELD

[75] Inventors: Cornell W. Alofs; Ronald R. Drenth, both of Petoskey, Mich.

[73] Assignee: Control Engineering Company, Harbor Springs, Mich.

[21] Appl. No.: 106,427

[22] Filed: Aug. 13, 1993

[51] Int. Cl.⁶ ............................................. B62D 1/00
[52] U.S. Cl. .............................. 364/424.02; 180/168; 318/587
[58] Field of Search ............... 180/168, 167, 169; 318/587; 364/424.02

[56] References Cited

U.S. PATENT DOCUMENTS

| | | | |
|---|---|---|---|
| 3,757,887 | 9/1973 | Moore et al. | 180/168 |
| 3,768,586 | 10/1973 | Thompson et al. | 180/168 |
| 3,993,156 | 11/1976 | Rubel | 180/168 |
| 4,006,790 | 2/1977 | Kawano et al. | 180/168 |
| 4,258,813 | 3/1981 | Rubel | 180/168 |
| 4,456,088 | 6/1984 | Nishiki et al. | 180/168 |
| 4,500,970 | 2/1985 | Daemmer | 364/424.02 |
| 4,520,889 | 6/1985 | Abe et al. | 180/168 |
| 4,556,940 | 12/1985 | Katoo et al. | 180/168 |
| 4,577,140 | 3/1986 | Schmidt et al. | 318/587 |
| 4,656,406 | 4/1987 | Houskamp | 318/587 |
| 4,665,369 | 5/1987 | Faller et al. | 324/326 |
| 4,665,487 | 5/1987 | Ogawa et al. | 364/424.02 |
| 4,700,302 | 10/1987 | Arakawa et al. | 364/424.02 |
| 4,707,297 | 11/1987 | Paske, Jr. et al. | 252/301.16 |
| 4,727,492 | 2/1988 | Reeve et al. | 364/424.02 |
| 4,772,832 | 9/1988 | Okazaki et al. | 318/587 |
| 4,780,817 | 10/1988 | Lofgren | 364/424.01 |
| 4,811,228 | 3/1989 | Hyyppa | 364/424.02 |
| 4,829,442 | 5/1989 | Kadonoff et al. | 364/449 |
| 4,860,209 | 8/1989 | Sugimoto et al. | 364/424.02 |
| 4,864,207 | 9/1989 | Miura et al. | 318/587 |
| 4,866,617 | 9/1989 | Matsuda et al. | 364/424.02 |
| 4,884,202 | 11/1989 | Ogawa et al. | 364/424.01 |
| 4,908,557 | 3/1990 | Sudare et al. | 318/587 |
| 4,918,362 | 4/1990 | Christensen et al. | 318/587 |
| 5,113,962 | 5/1992 | Calabrese | 180/167 |

FOREIGN PATENT DOCUMENTS

549674  12/1942  United Kingdom.

*Primary Examiner*—Kevin J. Teska
*Assistant Examiner*—Dan Fiul
*Attorney, Agent, or Firm*—C. J. Fildes & Co.

[57] ABSTRACT

A method and apparatus for guiding a driverless vehicle along a path defined by a guide cable carrying a current in a horizontal road surface includes mounting a first coil, having a major coil axis, at +45 degrees relative to the horizontal on said vehicle, mounting a second coil, having a major coil axis, at −45 degrees relative to the horizontal on said vehicle such that the axes of said first and second coils intersect, sensing both the radial and circular field vectors of the electromagnetic field with each coil, comparing the magnitude of the radial vector with the magnitude of the circular vector for each coil whereby the lateral position of the intersection point of the axes of the coils is determined relative to the guide cable to indicate the lateral displacement of the vehicle relative to said path, and using the displacement information in the vehicle steering system.

11 Claims, 2 Drawing Sheets

METHOD AND APPARATUS FOR GUIDING A DRIVERLESS VEHICLE USING A SENSOR TRACKING A CABLE EMITTING AN ELECTROMAGNETIC FIELD

TECHNICAL FIELD

This invention relates to apparatus and method for guiding a driverless vehicle along a guide cable buried in a road surface and more particularly to the use of two detecting coils placed in an X configuration on the vehicle for sensing an electromagnetic field direction vector independent of spacial and electromagnetic field magnitudes which information is used to measure lateral displacement of the vehicle relative to the guide cable to steer the vehicle so as to track the guide cable.

BACKGROUND ART

Perpendicularly disposed coils have been mounted on a driverless vehicle and used to detect the electromagnetic field surrounding a guide cable for automatically guiding the driverless vehicle along the cable. In known apparatus, one coil is disposed vertically and the other coil is disposed horizontally. Voltages induced in the coils are compared and used to determine the lateral location of the coils relative to the guide cable. This location information is processed and used to steer the vehicle.

The output voltage associated with these coils varies proportionately with current frequency in the guide cable, guide cable current magnitude, radial distance from the guide cable, coil core size, number of coil wire turns and the angle found between the major axis of the coil relative to a line from the cable to the center of the coil, referred to as angle beta.

As each coil is rotated in a plane perpendicular to the cable generating the electromagnetic field, it's output will become maximum when the coil core is parallel to the circular lines of flux. Its output will become minimum (zero) when the coil core is perpendicular to the flux, i.e. pointing to, or away from, the wire. Thus the relative effectiveness of the coil varies as the 'sin' of the angle beta.

The sin (beta) term, reflects the ratio of the radial to circular field sensed at each coil location and affects the sensor output. Therefore, the difference in magnitude sensed between the two coils is based on the radius term, the respective distances between each coil and the cable current. Changes in any of these factors have profound effects on the output signal. Additionally, depending on angle beta, some of either the radial and-/or circular field information associated with conventional apparatus must be discarded, resulting in a less than ideal signal to noise ratios. Another disadvantage with conventional coil arrangements is that the information provided by the coils only indicates the approximate lateral displacement from the guide cable and not the measure or distance of the lateral displacement. Therefore, vehicle steering correction can only be made in the direction opposite the displacement and not with precision.

DISCLOSURE OF INVENTION

An object of the present invention is to provide an apparatus for guiding a driverless vehicle along a guide cable disposed in a road surface that measures the lateral deviation of the vehicle from the guide cable.

Another object of the present invention is to provide an apparatus for guiding a driverless vehicle along a guide cable disposed in a road surface having an increased 'field of view' of the cable over conventional apparatus.

Another object of the present invention is to provide an apparatus including perpendicularly disposed coils for providing off-center displacement measurement information for guiding a driverless vehicle on the basis of sensed lateral displacement from a guide cable disposed in a road surface wherein the sensed lateral displacement is determined solely from an electromagnetic field direction vector and is independent of all electromagnetic field magnitude components.

Another object of the present invention is to provide a method for sensing an electromagnetic field direction vector at a single spacial point for providing an error signal that defines a measurement for guiding a driverless vehicle over a guide cable disposed in a road surface.

In carrying out the above objects and other objects the apparatus for guiding a driverless vehicle along a path defined by a guide cable disposed in a road surface, wherein the guide cable carries a current generating an electromagnetic field in the space surrounding the guide cable, includes a sensor for sensing the direction and magnitude of the electromagnetic field surrounding the cable. The sensor is defined by first and second spaced detecting coils mounted in an X-coil configuration on said vehicle in spaced longitudinal alignment such that major axes of the coils are intersecting at a point centrally of the coils as viewed in a longitudinal direction of travel of the vehicle (i.e., generally in the direction of current along the guide cable or wire) and said major axes are oriented generally at ±45 degrees relative to the road surface. Each detecting coil senses both the radial and circular field vectors of the magnetic field at a given point and a processor in communication with the first and second detecting coils compares the magnitude of the radial vector with the magnitude of the circular vector whereby the measurement of the lateral position of the sensor relative to said guide cable is determined.

A method for guiding the driverless vehicle along a path defined by a guide cable disposed in a horizontal road surface, wherein the guide cable carries a current generating an electromagnetic field in the space surrounding the guide cable, includes the steps of;

mounting a first coil, having a major coil axis, at +45 degrees relative to the horizontal on said vehicle;

mounting a second coil, having a major coil axis, at −45 degrees relative to the horizontal on said vehicle such that the axes of the first and second coils intersect centrally of the coils in the direction of current as viewed in a longitudinal direction of travel of the vehicle;

sensing both the radial and circular field vectors of the electromagnetic field with each coil;

comparing the magnitude of the radial vector with the magnitude of the circular vector to establish the lateral position of the intersection point of the axes of the coils relative to the path off-center displacement information; and communicating this information to a steering assembly to steer the vehicle.

The above objects and other objects, features, and advantages of the present invention are readily apparent from the following detailed description of the best mode

BEST MODE FOR CARRYING OUT THE INVENTION

Figure 1:
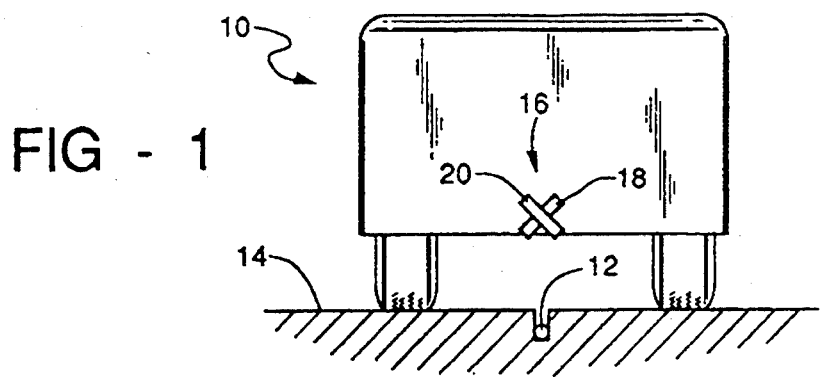
FIG. 1 is a schematic diagram of the front or rear of a driverless vehicle being guided over a guide cable.

With reference to FIG. 1, a driverless vehicle 10 is seen from the front or rear for following a guide cable 12 disposed in a horizontal road surface 14. Mounted on the vehicle 10 is a sensor 16 defined by two detecting coils 18,20. One coil 18 is mounted at +45 degrees relative to the road surface 14, and the other coil 20 is mounted at −45 degrees. The terms +45 and −45 degrees refer to the angle of the axis of the coil or its core relative to the road surface 14 or horizontal. The axes of the coils 16,18 intersect in the direction of current flow. The guide cable 12 carries an alternating current which, when undisturbed, generates an electromagnetic field having circular magnetic field lines which generate in the coils 18 and 20 voltages that may be used for measuring the lateral off center position of the vehicle 10 relative to the guide cable 12 and subsequently for steering the vehicle to follow the cable.

Figure 2:
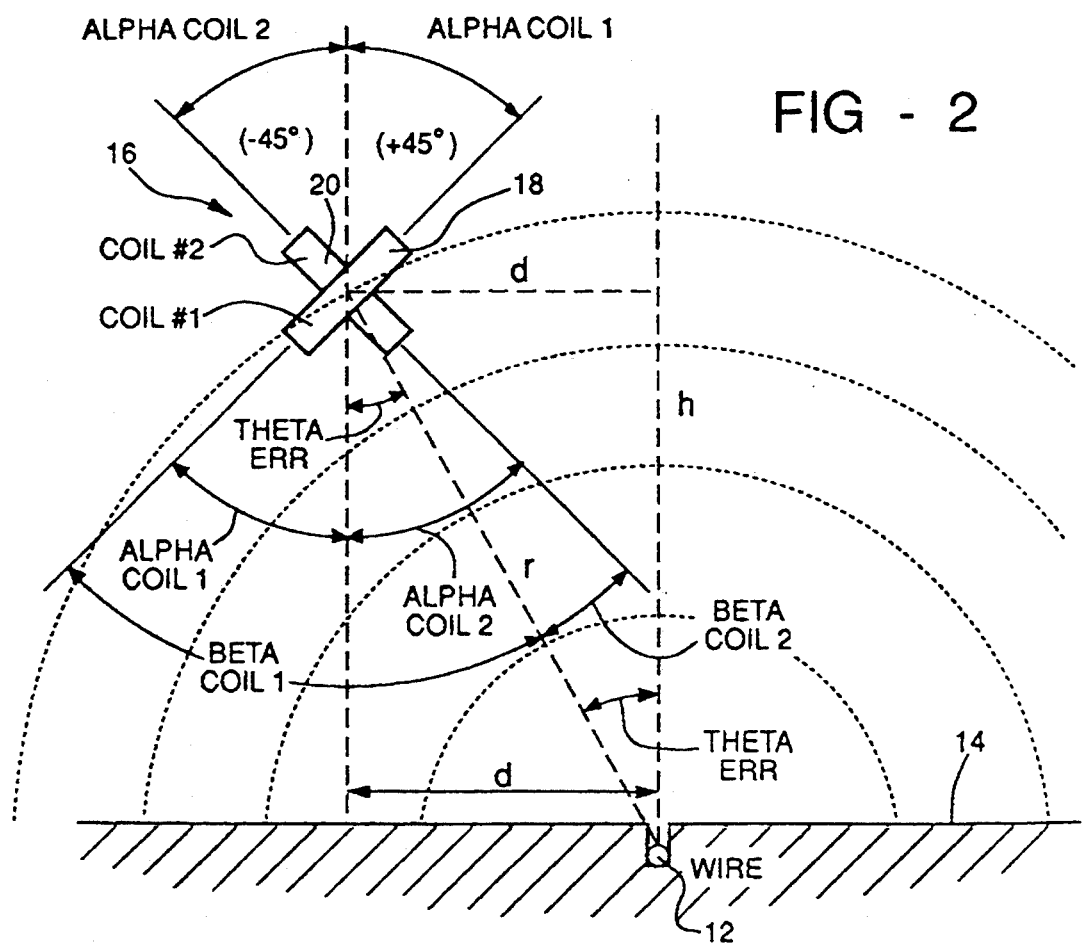
FIG. 2 is a diagram illustrating first and second coils mounted generally at ±45 degrees relative to the horizontal in accordance with the present invention, field lines and voltage vectors in the electromagnetic field due to the guide cable which carries alternating current.

The manner in which the driverless vehicle 10 is guided over the cable 12 will now be discussed with reference to FIGS. 2-4. The dashed lines in FIG. 2 are intended to represent the circular vectors of the magnetic field surrounding the guide cable 12. These field lines are intended to represent the case where the vicinity of the cable 12 is free of ferromagnetic objects and other current carriers which would distort the circular cross section of the field lines. The elevational location or height h of the detector coils 18,20 remains constant.

Due to the mounting geometry of the coils 8,20 wherein each major axis is positioned at ±45 degrees to the horizontal, each coil produces an output voltage which is the vector sum of both the horizontal and vertical portions of the guide cable's 12 cylindrical electromagnetic field. When the sensor 16 is centered over the cable each coil 18,20 sees equal horizontal and vertical signal magnitudes. However, the signs of each signal are opposite, as each coil 18,20 sees the source on different sides of their major axis. When the sensor 16 is moved laterally to the left or right of the guide cable 12, the output of each coil 18, 20 changes as a function of the sum of it's orientation to the horizontal plane (±45 degrees) and the error angle Theta, in the vertical plane.

Either coil's signal or voltage is maximum when it's major axis is perpendicular to a radius centered on the guide cable 12 (i.e. parallel to the dashed lines representing circular vectors of the magnetic field generated by the current through cable 12) and alternatively is minimum (zero) when it's major axis is pointing toward the guide cable. Since these coils 18, 20 move in a plane parallel to the cable 12, while cutting it's cylindrical electromagnetic field, the form of their output signals are proportional to the SIN of (Beta Coil 1 or 2).

Accordingly, the true position of the sensor 16 or error position information for a feedback loop as hereinafter described, is found by dividing the radial vector difference by the circular vector sum sensed by the coils 18,20. The actual signs imply that it is the sum of the radial vectors that is divided by the difference of the circular vectors, but to preserve a hardware phase comparator operation for monitoring 'guide-safe', the polarity of the coils 18,20 is chosen such that when the sensor 16 is centered over the cable 12, the output of the coils are 180 degrees out of phase. Thus, when the sensor 16 is centered over the cable 12, vectors being equal but of opposite sign, the radial vectors cancel in the numerator, while the circular vectors add to double, in the denominator. As the height h remains positive, i.e. the sensor 16 stays above the cable 12, the denominator will never reach zero and cause an invalid divide operation.

With reference to FIG. 2, the following equations apply:

Signal Coil 1=K1 * SIN (Beta Coil 1)

Signal Coil 2=K1 * SIN (Beta Coil 2)

Therefore:

$$\text{Distance} (+/- \text{Err}) = \text{Height} * \frac{\text{Signal of Coil 2} + \text{Signal of Coil 1}}{\text{Signal of Coil 2} - \text{Signal of Coil 1}}$$

The following is a mathematical proof for the above linear measurement equation.

Where by definition:
- Clock Wise (CW) Angles, from vertical, are positive.
- Radius r is defined as the line/distance between the center of the coils 18, 20 and the center of the cable 12.
- Current is defined as the electrical current in the wire.
- Frequency is defined as the frequency of the Current.
- Height h is the vertical distance from the cable to the horizontal plane in which the coils 18,20 can move.
- Distance d (±) is the horizontal distance from the cable to the center of the coils.
- Alpha Coil 1 is the off-vertical angle of coil 1 (+45)
- Alpha Coil 2 is the off-vertical angle of coil 2 (−45)
- Theta is the error angle between the radius and the height and K1 is proportional to current, frequency and inductance and inversely proportional to radius Signal Coil 1=K1 * SIN (Beta Coil 1)     (eq. 1)

Signal Coil 2=K1 * SIN (Beta Coil 2)     (eq. 2)

As seen in FIG. 2:

Beta Coil 1=Theta-Alpha Coil 1 and

Beta Coil 2=Theta-Alpha Coil 2 since when Theta=Alpha Coil 1, Beta Coil 1 goes to zero and when Theta=Alpha Coil 2, Beta Coil 2 goes to zero.
Therefore:

Signal Coil 1 = K1 * SIN (Theta-Alpha Coil 1)    (eq. 3)

Signal Coil 2 = K1 * SIN (Theta-Alpha Coil 2)    (eq. 4)

From the 'SIN (A-B)=SIN (A) *COS (B)-COS (A)*SIN (B)' trigonometric identity, equations 3 and 4 above can be expanded as:

Signal Coil 1 = K1 * (SIN(Theta)*COS(Alpha Coil 1)-COS(Theta)*SIN(Alpha Coil 1))    (eq. 5)

Signal Coil 2 = K1 * (SIN(Theta)*COS(Alpha Coil 2)-COS(Theta)*SIN(Alpha Coil 2))    (eq. 6)

Since, by definition:

Alpha Coil 1 = +45 degrees and Alpha Coil 2 = −45 degrees we see:

SIN(Alpha Coil 1)=COS(Alpha Coil 1)=−SIN(Alpha Coil 2)=COS(Alpha Coil 2)

with all magnitudes being equal to (Square Root of 2)/2 which is approximately equal to 0.707 . . .
Further referring to the geometry illustrated in FIG. 2, it can also be seen:

SIN(Theta)=Distance/Radius=d/r and

COS(Theta)=Height/Radius=h/r

Equations 5 and 6 can now be simplified by substitution:

Signal Coil 1 = K1 * (d/r * 0.707 − h/r * 0.707)

Signal Coil 2 = K1 * (d/r * 0.707 − h/r * −0.707)

or                             when:
Signal Coil 1 = K' * (d − h)    K' = (K1 * 0.707)/r
Signal Coil 2 = K' * (d + h)

To solve for the desired error Distance (±d) in terms of the sensor's height (h), the two coil outputs are combined as follows:

$$\frac{\text{Signal Coil 2} + \text{Signal Coil 1}}{\text{Signal Coil 2} - \text{Signal Coil 1}} = \frac{K' * ((d+h) + (d-h))}{K' * ((d+h) - (d-h))} =$$

$$\frac{K' * (d + h + d - h)}{K' * (d + h - d + h)} = \frac{2d}{2h} = \frac{d}{h} = \frac{\text{Distance}}{\text{Height}}$$

Therefore:

$$\text{Distance} (+/- \text{Err}) = \text{Height} * \frac{\text{Signal Coil 2} + \text{Signal Coil 1}}{\text{Signal Coil 2} - \text{Signal Coil 1}}$$

Use of this solution. In combination with known devices for a driverless vehicle steering, can be implemented as illustrated in the block diagram of FIG. 3.

Figure 3:
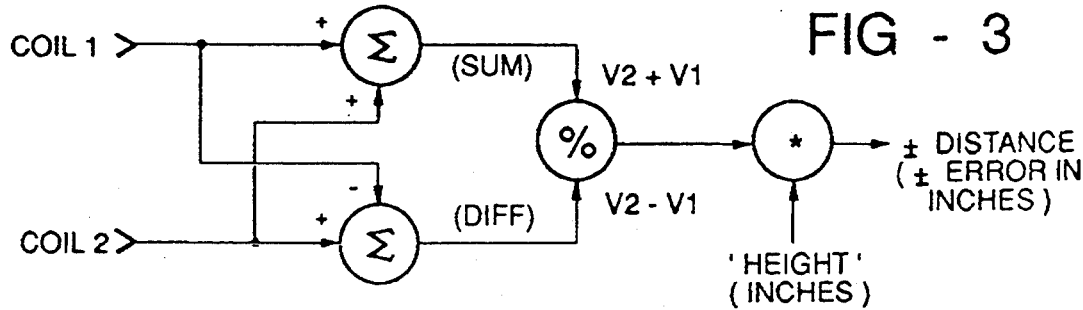
FIG. 3 is a block diagram illustrating the various voltages occurring in the detecting coils and their conversion to an output off center distance measurement signal.

With reference to FIG. 3, it can be seen that the single add, subtract, divide and multiply are all that is required for implementation of this solution, and can be handled by either analog or digital electronics. Additional signal conditioning, i.e. filtering, AC demodulation, A/C conversions can be easily accomplished.

In order to use sensor 16, the output of the coils 18, 20 has to be synchronously demodulated, in order to preserve the sign information.

Figure 4:
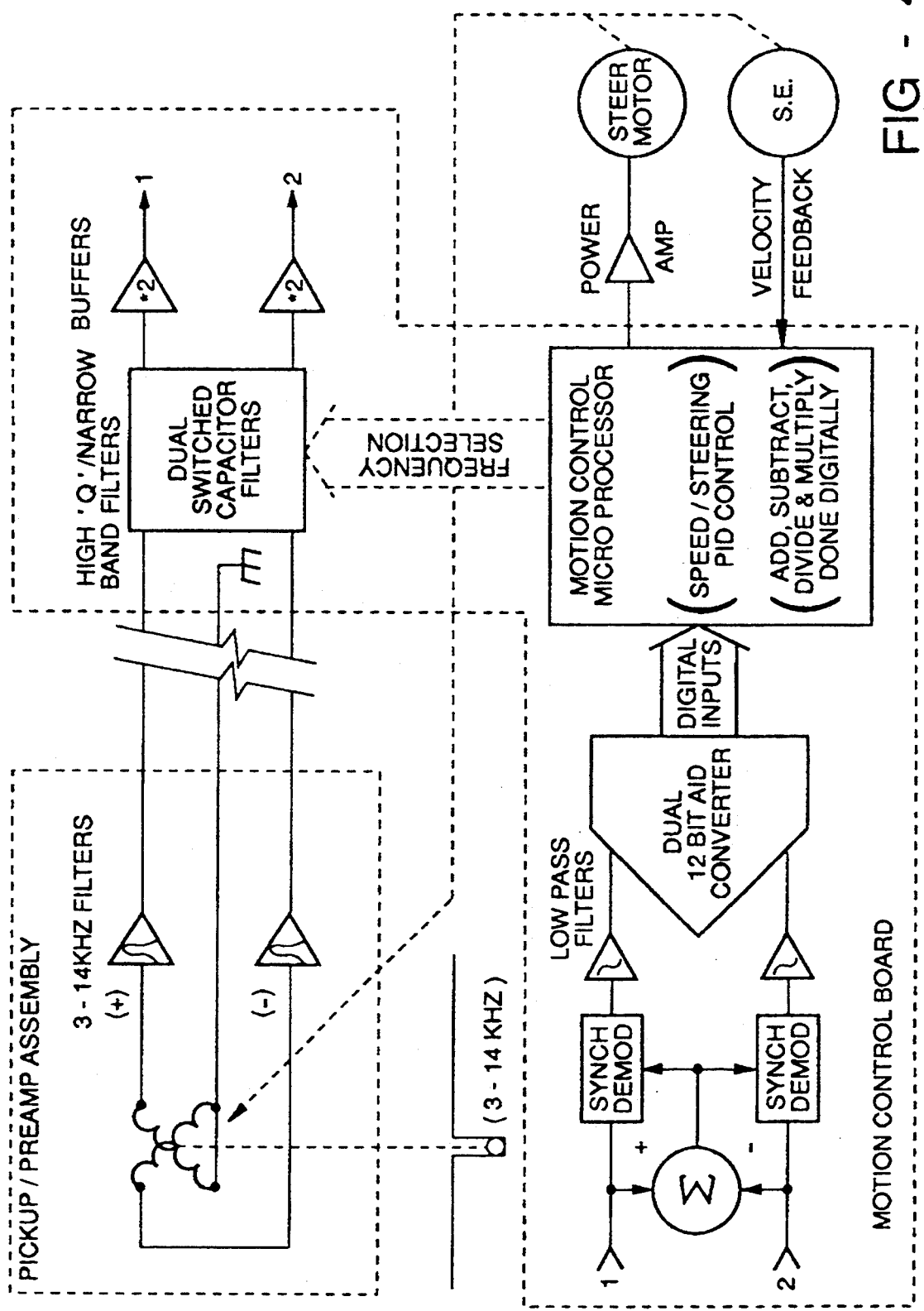
FIG. 4 is a schematic block diagram of one embodiment of the invention.

FIG. 4 illustrates in block diagram form one method of implementing the 'X-Coil' sensor 16 into the steering system of a driverless vehicle 10.

With reference to FIG. 4, an example of the hereinabove described 'X-Coil' configuration was designed for vehicle 10 steering for a working height of 3 inches above a 100 milliampere guidepath cable, yielding a hardware 'guide-safe' width of ±3 inches. However, for those cases where the sensor height h has to be either higher or lower, the software 'guide-safe' feature hereinafter below described may be employed so that the sensor 16 will easily cover the 1 to 6 inch height range. With use of AGC, a digital steering package can handle a cable current range of 20 to 400 milliamperes, a height range of 1 to 6 inches and a horizontal displacement range of ±12 inches.

Using high Q filters and synchronous demodulators, all external signals, not synchronous in frequency and phase, are rejected. One signal that will not be rejected, however, is the same wire nearby, such as with a 'return cut' in the path. A return cut will distort the electromagnetic field, thereby shifting the null as seen by the sensor. This distortion will cause a null shift that is a direct proportion of the distances of the sensor to each of the cables, i.e. if the height is 3 inches; and the return cut is 24 inches, the null will shift 3/24 times the unity output position (3 inches at a 3 inch height), or 3/24*3=⅜ of an inch, with the direction of the shift depending on the phase of the 'return cut'. At one half the distance between the two cables, everything fails as the resulting circular vector, the division, goes to zero. Linearity also falls off at the 10 to 12 inch range due to return cuts' as close as 20 feet. For these reasons, the current package scales the sensor's output signal to ± full range at ±8 inches of horizontal displacement.

Accordingly the field of view seen by sensor 16 is greatly increased, without losing port and starboard directions. This improves the 'off-wire maneuver' recapture procedure. Also with the vastly improved linearity, and current provisions for entry of the vehicles sensor height, all outputs become a uniform ratio of ±8 inches, thereby providing off-wire steering adjustments of ±4 inches, to account for 'return cuts' and/or to center on loads.

Both the wider 'field of view' and the linearity, provide variable programmed 'guide-safe' limits. This feature has proven very useful in monitoring 'off-wire maneuvers', as the ANSI specifications allows a ±6 inch guide-safe window for such operations. The internal hardware phase comparators provide a primary ±'guide safe' output. This window, however, is not set to ±3 inches for all sensor heights.

With the 'x-coil' configuration the ± 'guide safe' window becomes equal to the height h of the coils 18, 20 above the wire, i.e. for a sensor 16 centered 3 inches above the wire, the 'guide-safe' window will be ±3 inches and will vary ±½ inch if the wire depth changes ±½ inch. Under control of a vehicle microprocessor, the digital steering software controls which one, or both, of the 'guide-safe' signals are active.

While the best mode for carrying out the invention as been described in detail, those familiar with the art to which this invention relates will recognize various alternative designs and embodiments for practicing the invention as defined, by the following claims.

What is claimed is:

1. An apparatus for guiding a driverless vehicle along a path defined by a guide cable disposed in a horizontal road surface, said guide cable carrying a current thereby generating an electromagnetic field in the space surrounding the guide cable, said apparatus comprising:

sensor means for sensing the direction and magnitude of the electromagnetic field;

said sensor means including first and second detecting coils mounted in an X-coil configuration on said vehicle in spaced longitudinal alignment such that major axes of said coils intersect at a point centrally of the coils as viewed in a longitudinal direction of travel of said vehicle, and said major axes are oriented generally at ±45 degrees relative to said road surface;

each detecting coil sensing both the radial and circular field vectors of said magnetic field; and comparing means in communication with said first and second detecting coils for comparing the magnitude of the radial vector with the magnitude of the circular vector whereby the lateral position of said sensor means relative to said guide cable is determined.

2. Apparatus as in claim 1 wherein said first and second coils have a core length and core diameter and wherein the longitudinal spacing between said coils is at least equal to one core length.

3. Apparatus as in claim 1 further including a mounting board having first and second sides for mounting said first detecting coil at +45 degrees on the first side of said mounting board and said second detecting coil at −45 degrees on said second side and wherein said mounting board is fixed to said vehicle.

4. Apparatus as in claim 2 wherein said comparing means divides the sensed electromagnetic fields radial vector by the circular vector whereby this ratio is proportional to the horizontal displacement of said sensor divided by the height of said sensor above said cable.

5. Apparatus as in claim 4 further including means for vehicle steering in communication with said comparing means for steering said vehicle in response to output received from said comparing means.

6. Apparatus as in claim 5 wherein said steering means is a digital steering system.

7. Apparatus as in claim 5 wherein said steering means is an analog steering system.

8. A method for guiding a driverless vehicle along a path defined by a guide cable disposed in a horizontal road surface, said guide cable carrying a current, thereby generating an electromagnetic field in the space surrounding the guide cable, said method comprising the steps of:

mounting a first coil, having a major coil axis, at +45 degrees relative to the horizontal on said vehicle;

mounting a second coil, having a major coil axis, at −45 degrees relative to the horizontal on said vehicle such that said axes of said first and second coils intersect centrally of the coils as viewed in a longitudinal direction;

sensing both the radial and circular field vectors of the electromagnetic field with each coil; and comparing the magnitude of the radial vector with the magnitude of the circular vector for each coil whereby the lateral position of the intersection point of the axes of said coils is determined relative to the guide cable to indicate the lateral displacement of said vehicle relative to said path.

9. The method of claim 8 wherein said mounting of said second coil includes spacing said coils at least one coil core length apart in said longitudinal direction.

10. The method of claim 9 further including the step of communicating said lateral displacement information to a controller for vehicle steering.

11. The method of claim 8 wherein the lateral position of the intersection point of the axes of said coils is defined by:

$$\text{Distance} (+/- \text{Err}) = \text{Height} * \frac{\text{Signal of Coil 2} + \text{Signal of Coil 1}}{\text{Signal of Coil 2} - \text{Signal of Coil 1}}$$

wherein:

Distance (±)=horizontal distance from the cable to the center of the coils

Height=vertical distance from the cable to the horizontal plane in which the coils can move.

* * * * *